United States Patent
Shibata et al.

(10) Patent No.: US 6,926,286 B2
(45) Date of Patent: Aug. 9, 2005

(54) GASKET HOLDING DEVICE

(75) Inventors: Hideshi Shibata, Hamamatsu (JP); Kanji Hanashima, Hamamatsu (JP); Kenichi Takahiro, Hamamatsu (JP); Hideaki Mori, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 10/382,383

(22) Filed: Mar. 6, 2003

(65) Prior Publication Data

US 2003/0184027 A1 Oct. 2, 2003

(30) Foreign Application Priority Data

Mar. 28, 2002 (JP) .................................... 2002-092944
Mar. 28, 2002 (JP) .................................... 2002-092945

(51) Int. Cl.[7] ............................................. F16J 15/02
(52) U.S. Cl. ..................... 277/637; 277/598; 277/630
(58) Field of Search ............................... 277/598, 637, 277/630; 411/533

(56) References Cited

U.S. PATENT DOCUMENTS

| | | | | |
|---|---|---|---|---|
| 1,784,142 A | * | 12/1930 | Hosking ..................... 428/589 |
| 2,672,069 A | * | 3/1954 | Mitchell ..................... 411/368 |
| 3,472,303 A | * | 10/1969 | Beard ......................... 411/423 |
| 3,967,049 A | * | 6/1976 | Brandt ........................ 174/53 |
| 4,292,007 A | * | 9/1981 | Wagner ...................... 411/156 |
| 4,355,198 A | * | 10/1982 | Gartland, Jr. ............... 174/66 |
| 4,648,607 A | * | 3/1987 | Yamada et al. ............. 277/598 |
| 4,813,691 A | * | 3/1989 | Schoenborn ................ 277/598 |
| 5,141,237 A | * | 8/1992 | Yamada et al. ............. 277/317 |
| 5,232,228 A | * | 8/1993 | Miyaoh ...................... 277/313 |
| 5,259,629 A | * | 11/1993 | Udagawa .................... 277/598 |
| 5,281,464 A | * | 1/1994 | Sekioka et al. ............. 277/630 |
| 5,513,855 A | | 5/1996 | Yasui |
| 5,551,702 A | | 9/1996 | Inamura |
| 5,586,770 A | | 12/1996 | Udagawa et al. |
| 5,620,290 A | * | 4/1997 | Homfeldt et al. ........... 411/533 |
| 5,673,920 A | | 10/1997 | Mockenhaupt |
| 5,735,532 A | * | 4/1998 | Nolan et al. ................ 277/630 |
| 5,791,660 A | | 8/1998 | Belter |
| 6,015,152 A | * | 1/2000 | Swensen et al. ............ 277/321 |
| 6,371,492 B1 | | 4/2002 | Baron |
| 6,508,471 B1 | | 1/2003 | Blau |
| 2002/0190479 A1 | | 12/2002 | Sumi et al. |

FOREIGN PATENT DOCUMENTS

JP         08-049597         2/1996

* cited by examiner

*Primary Examiner*—Alison K. Pickard
(74) *Attorney, Agent, or Firm*—Flynn, Theil, Boutell & Tanis, PC

(57) ABSTRACT

To obtain a gasket holding device which is unlikely to slip out of a bolt and facilitates mounting of the bolt thereon, a bolt mounting hole made in a metal plate constituting the gasket holding device is provided with an engaging portion which engages the bolt. This engaging portion is formed by processing part of the metal plate on the bolt mounting hole thinly such that it is elastically deformed and projected in between a crest and a root of the bolt.

3 Claims, 4 Drawing Sheets

GASKET HOLDING DEVICE

BACKGROUND OF THE INVENTION

1. Field of the Invention

The present invention relates to improvement of a gasket holding device used for holding a metallic gasket aiming at preventing leakage of fluid in a ultra-high vacuum apparatus for use in an semiconductor manufacturing apparatus, a nuclear apparatus and the like and for disposing the same metallic gasket at a predetermined position between flanges.

2. Description of Related Art

Conventionally, various kinds of the metallic gaskets are used in the semiconductor manufacturing apparatus and the like in order to obtain a high vacuum condition.

The aforementioned gasket is applied fittingly so as to clog a gap between two components adjacent each other such as flanges, so that it is disposed in a groove or the like between the components to joint the two components.

At this time, foreign matter may adhere to a gasket or the gasket may be provided with a minute flaw upon handling, thereby leading to leakage. Further, when the gasket is installed, its position may be deflected, so that tightening of the gasket becomes unequal, thereby sometimes generating a leakage.

The reason for use of the gasket is to enable the gasket to be attached or detached to/from an apparatus without touching directly the gasket.

The generally known gasket holding device is composed of a metal thin plate which is elastically deformable and has a gasket introduction hole and a gasket supporting hole which is connected to this introduction hole. Further, if a single gasket holding device is provided with plural gasket holding portions, there is an advantage that the plural gaskets can be attached or detached all at once.

In a gas supplying unit for use in the semiconductor manufacturing apparatus, various components such as a valve, filter, regulator and mass flow controller are installed on arranged metallic blocks called substrate having a flow path. Because these components are concentrated in a narrow space, taking labor and time for replacement of any component is a problem to be solved.

In the aforementioned gas supplying unit, the gasket is inserted in between the substrate and each of various components and fit to the groove in the substrate. To facilitate mounting of the gasket, often the gasket holding device having the gasket is fixed to each of various components with bolts and then, this assembly is fixed onto the substrate with bolts.

In order to hold the gasket holding device with the bolts, its bolt mounting hole is formed so as to be smaller than the outside diameter of a crest portion and larger than the outside diameter of a root portion. If such a bolt mounting hole is formed, an inner peripheral edge of the bolt mounting hole is elastically deformed and projected in between the crest and the root which constitute a bolt thread. Consequently, the gasket holding device is blocked from sliding freely on the bolt, and thereby the mounting performance of the gasket on various kinds of components is improved.

As the shape of the bolt mounting hole in the aforementioned gasket holding device, for example, circular shape, cubic shape and rectangular shape can be mentioned. When the outside diameter of the crest portion of the bolt is too small with respect to the diameter of the bolt mounting hole, the gasket holding device is likely to slip out of the bolt. When a gap between the bolt mounting hole and the outside diameter of the crest of the thread is large, a high friction occurs when the bolt is moved, so that the bolt is hard to fit.

Further, most metallic annular gaskets are as small as about 10 mm in outside diameter so as to meet miniaturization of components of a semiconductor manufacturing apparatus, so that when a gasket is mounted in a concave portion formed in a flange joint face, the gasket is likely to be deflected from its proper position. Consequently, tightening of the gasket becomes unequal, and thereby leakage may occur, foreign matter may adhere to the gasket when it is mounted or a minute flaw may be made in the gasket.

For the reason, the gasket holding device has been utilized to attach/detach the gasket to/from an apparatus without touching directly the gasket.

The gasket holding device is composed of mainly an elastically deformable thin metal plate (0.1 mm thick) and contains a gasket introduction hole and a supporting hole communicating with the hole, formed in the metal plate. The gasket is slid from the introduction hole into the supporting hole, so that it is held by the supporting hole.

A gasket holding device capable of supporting plural gaskets (3 max.) has been also known.

When the gasket holding device is employed for a gas supplying unit of a semiconductor manufacturing apparatus, particularly following matters are considered.

(1) The gas supplying unit contains a large number of components assembled in a small space.

(2) Each component has a square flat face for mounting a gasket holding device and the respective components are arranged in line.

(3) Each component has a groove for receiving the gasket.

(4) The number of gaskets used for a single component differs depending on the component.

(5) If a groove for receiving the gasket is provided, the groove is disposed in the center of a component. If plural grooves are provided, the grooves are disposed in the center and near the center of the component.

When a gasket is attached to or detached from the above-described gas supplying unit, there are following problems.

In the case where mounting of a gasket on an apparatus is forgotten, it is possible to verify whether or not the gasket has been mounted through a fluid leak test. However, because a large number of components are provided in the apparatus, it is difficult to confirm which component misses the gasket or whether or not a necessary number of the gaskets are loaded even if some gaskets are provided.

SUMMARY OF THE INVENTION

To solve the problems of the conventional gasket holding device, a first object of the present invention is to provide a gasket holding device which enables bolts to be applied easily and is unlikely to slip out of the bolts when it is mounted.

A second object of the present invention is to provide a gasket holding device which reduces a possibility that the gasket is attached at an erroneous position, enables to confirm how many gaskets are disposed where easily after they are attached, secures a safety upon attachment/detachment thereof and may not damage other component.

To achieve the first object, according to a first aspect of the present invention, there is provided a gasket holding device having a metal plate for holding a gasket, the metal plate including bolt mounting holes each permitting a bolt to pass through so as to attach/detach the gasket to/from an object apparatus using the gasket, and the bolt mounting hole having an engaging portion which engages the bolt.

The gasket holding device of the first aspect of the present invention may have following structures (1) to (4).

(1) The engaging portion is projected from an inner periphery of the bolt mounting hole toward the center thereof so as to engage the bolt.

(2) In the structure of the above (1), the engaging portion is composed of part of the metal plate and engages the bolt through its curved portion along an outer periphery of the bolt, the length of a portion projected in a diameter direction of the bolt from an engagement position thereof is 0.5 to 2 mm, and the thickness thereof is 20 to 80% the thickness of the metal plate.

(3) The engaging portion engages the bolt through the curved portion along the outer periphery of the bolt and at least one cutout 0.5 to 2 mm long in the diameter direction of the bolt from an engagement position thereof is formed in the metal plate.

(4) In the structure of the above (2), at least one cutout 0.5 to 2 mm long in the diameter direction of the bolt is formed in the engaging portion.

Further, to achieve the second object, according to a second aspect of the present invention, there is provided a gasket holding device having a metal plate for holding a gasket, the metal plate including bolt mounting holes each permitting a bolt to pass through so as to attach/detach the gasket to/from an object apparatus using the gasket, and the metal plate being rectangular and including cutouts formed in side edges of long sides thereof corresponding to the gasket attachment positions of the metal plate.

The gasket holding device of the second aspect of the present invention may have following structures (5) and (6).

(5) The length of the long side of the metal plate is 1 to 10 mm longer than the length of a part on which the gasket holding device is to be mounted.

(6) The cutout is V-shaped.

In addition, the gasket holding device of the second aspect of the present invention may have following structures (7) to (11) in order to achieve the first and second objects.

(7) The bolt mounting hole has an engaging portion which engages the bolt.

(8) The engaging portion is projected from an inner periphery of the bolt mounting hole toward the center thereof so as to engage the bolt.

(9) The engaging portion is composed of part of the metal plate and engages a bolt through its curved portion along an outer periphery of the bolt, the length of a portion projected in a diameter direction of the bolt from an engagement position thereof is 0.5 to 2 mm, and the thickness thereof is 20 to 80% the thickness of the metal plate.

(10) The engaging portion engages the bolt through the curved portion along the outer periphery of the bolt and at least one cutout 0.5 to 2 mm long in the diameter direction of the bolt from an engagement position thereof is formed in the metal plate.

(11) At least one cutout 0.5 to 2 mm long in the diameter direction of the bolt is formed in the engaging portion.

DESCRIPTION OF THE PREFERRED EMBODIMENTS

Figure 1:
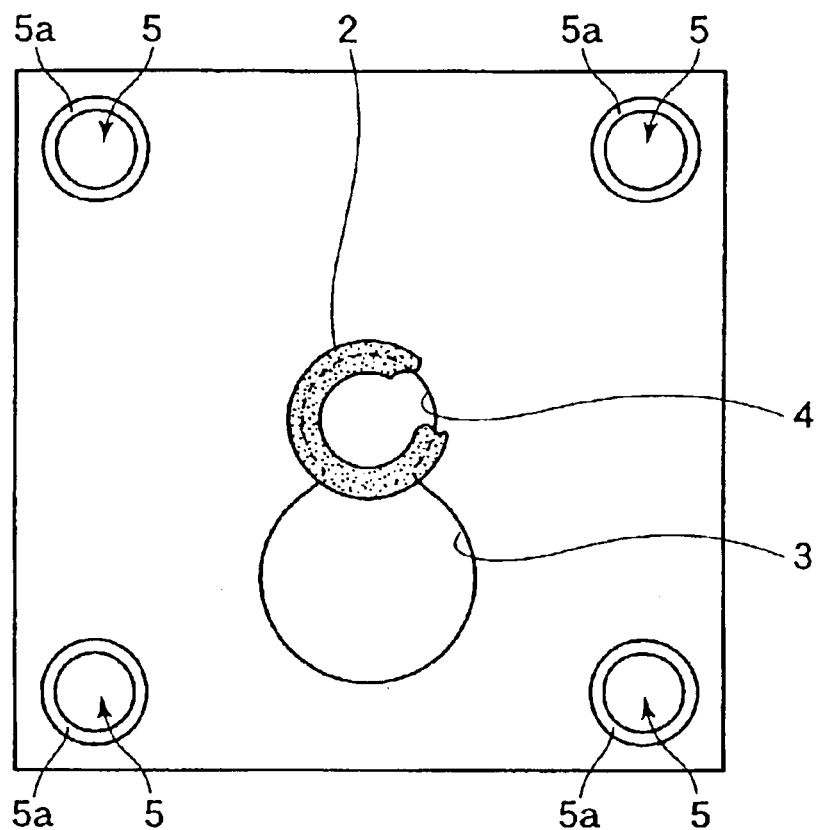
FIG. 1 is a plan view showing an embodiment of a gasket holding device of the present invention.
Figure 2:
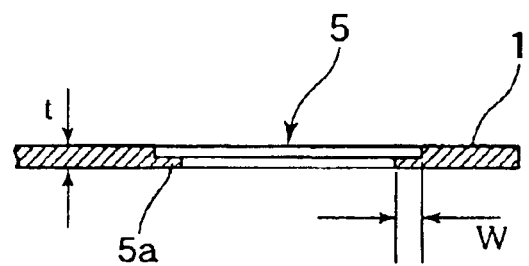
FIG. 2 is a sectional view of a bolt mounting hole in the gasket holding device of FIG. 1.

FIGS. 1 and 2 show an embodiment of a first aspect of the present invention. Referring to the same figure, reference numeral 1 denotes a metal plate which is elastically deformable constituting a gasket holding device, for example, about 0.1 mm thick, reference numeral 2 denotes an annular gasket mounted on the metal plate and having a groove on its outer periphery, reference numeral 3 denotes a gasket introduction hole, reference numeral 4 denotes a supporting hole, and reference numeral 5 denotes a bolt mounting hole. The bolt mounting hole 5 is provided as a mounting hole which a bolt is to be passed through so as to be attached to or detached from, for example, a semiconductor manufacturing apparatus and has an engaging portion which engages the bolt. This engaging portion is formed so as to be projected from, for example, the inner periphery of the bolt mounting hole 5 toward the center thereof so that it engages the bolt. FIG. 2 shows an example thereof. Referring to FIG. 2, the aforementioned engaging portion corresponds to a thin portion 5a which is part of the metal plate and the inner periphery which engages a thread of the bolt is formed thinly by etching processing or the like. Namely, this portion 5a engages the bolt through its curved portion along an outer periphery of the bolt and the length of a portion projected in a diameter direction of the bolt W (width in the bolt diameter direction from a portion which engages the bolt thread) is 0.5 to 2 mm and its thickness to is 20 to 80% the thickness t of the metal plate 1.

Figure 3:
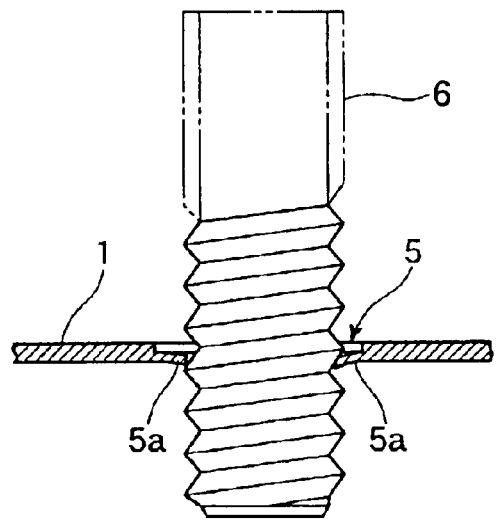
FIG. 3 is a sectional view showing an engagement state between a bolt and the bolt mounting hole.

FIG. 3 shows a state in which the aforementioned gasket holding device is held by the thread of the bolt 6 under an engagement. Because in the bolt mounting hole 5 of the gasket holding device, the thin portion 5a on the hole is elastically deformed and projected between the crest and the root of the bolt thread so that it is engaged. The gasket holding device is held on the bolt by that engagement action.

When the thin portion 5a on the bolt mounting hole 5 is less than 20% the thickness of the metal plate 1, deformation of a portion coming into contact with the bolt is accelerated so that the gasket holding device is likely to slip out of the bolt. When it is larger than 80%, attachment performance of the bolt is not changed. Further, when the length of the thin portion 5a is shorter than 0.5 mm, no effect is produced and when it is longer than 2 mm, the bolt is likely to be deflected to the right or left, so that the gasket is also deflected thereby its sealing performance being reduced. In the meantime, needless to say, even if the thin portion 5a is formed by laser processing instead of the etching processing, the same effect can be obtained.

Figure 4:
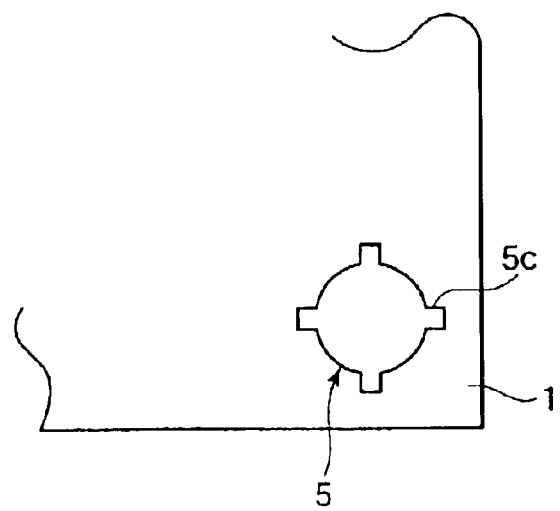
FIG. 4 is a partial plan view showing another embodiment of the gasket holding device according to a first aspect of the present invention.

FIG. 4 shows another embodiment of the first aspect of the present invention. Referring to the same figure, reference numeral 5c denotes a cutout formed as the engaging portion, in which the bolt mounting hole 5 engages the bolt through its curved portion along the outer periphery of the same bolt. The cutout is formed in the metal plate 1, for example, 0.5 to 2 mm long in the bolt diameter direction from the engagement position.

Figure 5:
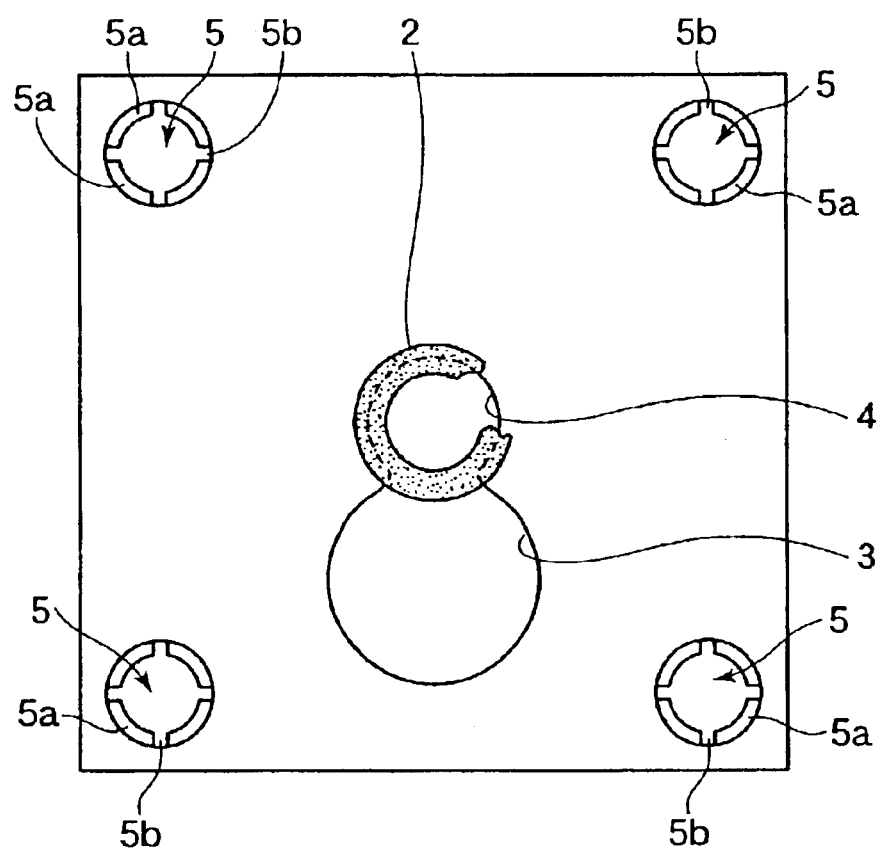
FIG. 5 is a plan view showing still another embodiment of the gasket holding device according to the first aspect of the present invention.
Figure 6:
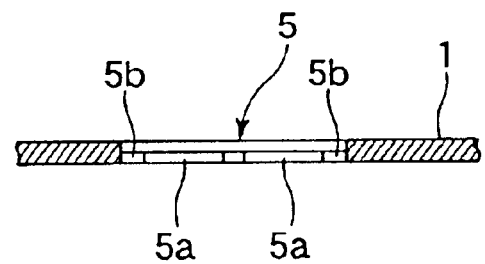
FIG. 6 is a sectional view of the bolt mounting hole according to the embodiment of FIG. 5.

FIGS. 5 and 6 show still another embodiment of the first aspect of the present invention. In the bolt mounting hole 5 of the metal plate 1, one or plural cutouts 5b, each 0.5 to 2.0 mm long, are made in the diameter direction in the thin portion 5a which engages the bolt thread.

Such a structure having the cutouts 5b in the thin portion 5a of the bolt mounting hole improves the mounting performance of the bolt. The bolt mounting hole having such cutouts provides a wider portion which engages the bolt than a bolt mounting hole containing a protrusion. Thus, even when a strong external force is applied to the bolt, the gasket holding device is unlikely to slip out of the bolt.

The aforementioned gasket holding device can be used for a gasket having a groove in its outer periphery such as a metal C-ring gasket and a metal C-ring gasket containing a coil spring. The bolt mounting hole 5 through which the bolt is to be passed is formed so as to be smaller than the outside diameter of a crest portion of the bolt and larger than the outside diameter of a root of the bolt. Further, the bolt mounting hole 5 through which the bolt is to be passed is so processed that a range 0.5 mm long in the diameter direction from the portion which engages the bolt turns to the thin portion 5a 0.05 mm in thickness by etching processing. Furthermore, four cutouts 1 mm long are made in the diameter direction in the thin portion 5a which engages the thread of the bolt.

COMPARATIVE EXAMPLE 1

According to Comparative example 1, as shown in FIG. 6, in a gasket holding device which holds an annular gasket 2 having a groove in an outer periphery thereof by nipping, the bolt mounting hole 5 through which the bolt is to be passed is formed so as to be smaller than the outside diameter of the crest of the bolt.

Table 1 indicates its test results.

TABLE 1

| | Total mounting time (sec) | Deflection amount (mm) | Remark |
|---|---|---|---|
| Example 1 | 65 | 25 | |
| Example 2 | 55 | 27 | |
| Example 3 | 80 | 50 | Slip-out |

As evident from Table 1, in Example 1 in which the thickness of the inner periphery of the bolt mounting hole was reduced to half, mounting time was reduced by 20% as compared to Comparative example 1 and its deflection amount was reduced to half. Further, although in Example 2 in which the thickness is half while additional cutouts is made, it has been found that difficulty of deflection is not so different from Example 1 but the mounting time is further reduced. The reason is considered to be that the plate is made deformable easily from the cutouts as an initial point.

Figure 7:
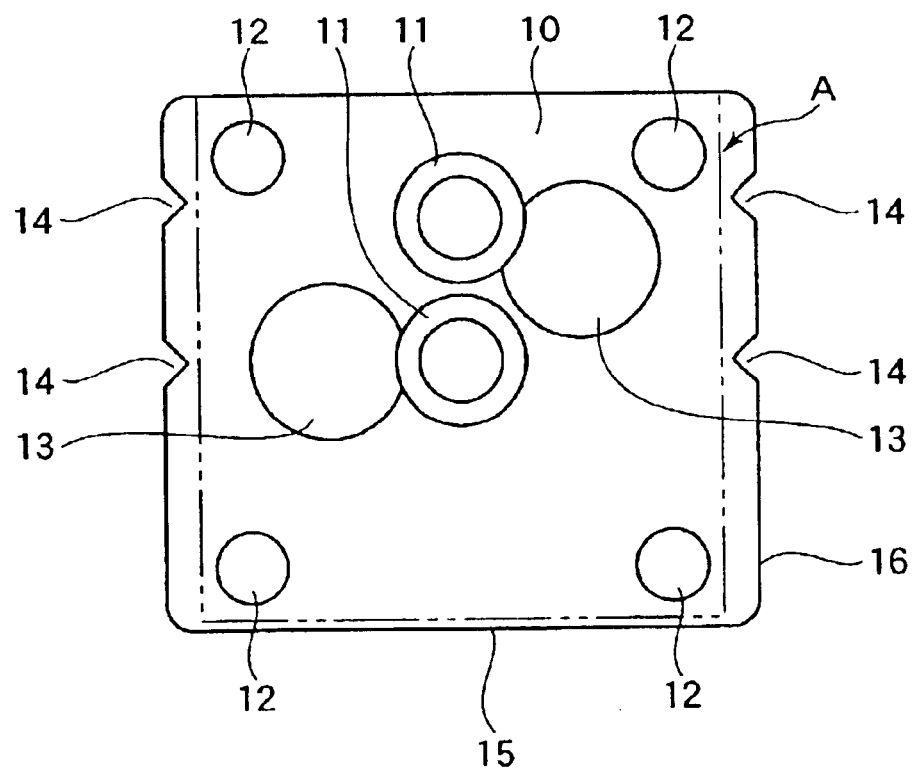
FIG. 7 is a plan view of one embodiment of a gasket holding device according to a second aspect of the present invention.

FIG. 7 shows an embodiment according to a second aspect of the present invention. Referring to the same figure, reference numeral 10 denotes a metal plate (for example, SUS304) 0.1 mm thick, reference numeral 11 denotes a gasket, reference numeral 12 denotes a bolt mounting hole (mounting hole), reference numeral 13 denotes a gasket introduction hole and reference numeral 14 denotes a cutout.

The metal plate 1 is formed in a rectangular shape and its short side 15 is, for example, 28 mm while its long side 16 is, for example, 32 mm. The long sides 16 have V-shaped cutouts 14 with the width of 2 mm on edge sides thereof. Corner portions 17 of the metal plate 1 are round-shaped with radius of 0.3 mm. According to the above-described embodiment, two gaskets 11 are attached to the metal plate 1 and the cutouts 14 are provided at positions each corresponding to the gasket. In the meantime, a two-dot and chain line indicates a part A on which the gasket holding device is to be mounted.

The gasket holding device having the above-described structure provides following effects.

(a) Because the metal plate 1 is rectangular, there is no possibility that that plate may be mounted in such a wrong direction that it is turned at 90°.

(b) Because the cutouts of the number corresponding to the gaskets 11 are provided on the edge side of the long side 16 of the metal plate 1, how many gaskets exit at what position can be confirmed after the mounting.

(c) Because the cutouts are provided as an indicator for confirmation of a gasket mounting position, even when the finger touches the outer periphery of the gasket holding device at the time of mounting, it is difficult to hook on the cutout, thereby securing a high safety.

(d) There is no fear that it may cut out wires or the like around a mounting object part.

In the above-described embodiments, it is permissible to provide a bolt mounting hole with any one of the respective engaging portions which engages the bolt and the same effect can be expected.

As described above, according to the first aspect of the present invention, even when it is applied to an ultra-high vacuum apparatus such as a semiconductor manufacturing apparatus, the gasket is unlikely to slip out and mounting of the bolt is easy.

According to the second aspect of the present invention, in addition to the above-described effect, the possibility that the gasket may be attached to a wrong position is lowered, the gasket attachment position can be confirmed easily after it is attached and additionally, there is no fear other components may be damaged at the time of the attachment.

What is claimed is:

1. A gasket holding device comprising a substantially rectangular flat elastically deformable metal plate including a gasket supporting hole and a gasket introduction hole for holding a gasket, said metal plate having a first length and a second length that is less than the first length, said metal plate including bolt mounting holes each including an open bore enabling a bolt to pass through so as to attach/detach the gasket holding device to/from an object apparatus, the bolt mounting holes each having an engaging portion monolithic with said metal plate and projecting inwardly from a periphery of said bolt mounting hole, an inner edge of the open bore of said engaging portion projecting between a crest and a root along an outer periphery of the bolt, said engaging portion having a width in a bolt diameter direction from the inner edge to the periphery of said bolt mounting hole of from 0.5 mm to 2 mm, and said engaging portion having a thickness that is 20% to 80% the thickness of the metal plate, said engaging portion being formed as a sunken planar face on one side of said metal plate while the other side of said metal plate is substantially planar, and opposing outer edges of said metal plate corresponding to the first length thereof, each said edge including a notch extending into said metal plate, said notches being located to form an imaginary line therebetween that is transverse to the outer edges of the plate corresponding to the first length, the imaginary line passing through a central point of said gasket supporting hole, and opposing outer edges of said metal plate corresponding to the second length thereof each being free from notches, wherein said notches enable accurate alignment of said gasket holding device, and wherein said engaging portion of each said bolt mounting hole prevents slip out of the corresponding bolt during mounting of the gasket holding device.

2. The gasket holding device according to claim 1, wherein the inner edge of the opening of said engaging portion has a circular shape.

3. The gasket holding device according to claim 1, wherein said engaging portion includes cutouts having a depth of from 0.5 mm to 2 mm extending radially outward from the inner edge toward the periphery of the bolt mounting hole.

* * * * *